(12) United States Patent
Wang et al.

(10) Patent No.: US 12,249,183 B2
(45) Date of Patent: Mar. 11, 2025

(54) APPARATUS AND METHOD FOR DETECTING FACIAL POSE, IMAGE PROCESSING SYSTEM, AND STORAGE MEDIUM (71) Applicant: CANON KABUSHIKI KAISHA, Tokyo (JP)

(72) Inventors: Qiao Wang, Beijing (CN); Deyu Wang, Beijing (CN); Kotaro Kitajima, Kanagawa (JP); Naoko Watazawa, Tokyo (JP); Tsewei Chen, Tokyo (JP); Wei Tao, Beijing (CN); Dongchao Wen, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 369 days.

(21) Appl. No.: 17/687,432

(22) Filed: Mar. 4, 2022

(65) Prior Publication Data
US 2022/0292878 A1 Sep. 15, 2022

(30) Foreign Application Priority Data
Mar. 10, 2021 (CN) .......................... 202110262393.3

(51) Int. Cl.
G06V 40/16 (2022.01)
G06V 10/24 (2022.01)
(Continued)

(52) U.S. Cl.
CPC .......... *G06V 40/174* (2022.01); *G06V 10/243* (2022.01); *G06V 10/7715* (2022.01);
(Continued)

(58) Field of Classification Search
None
See application file for complete search history.

(56) References Cited

U.S. PATENT DOCUMENTS 11,039,075 B1 * 6/2021 Almehmadi ..... G08B 13/19613
11,488,293 B1 * 11/2022 Guo .......................... G06T 5/20
(Continued)

FOREIGN PATENT DOCUMENTS

JP 2020177605 * 10/2020
JP 2020177605 A 10/2020

OTHER PUBLICATIONS

Ramos "Foundation of Robotics", UTEC, 2018 (Year: 2018).*
(Continued)

*Primary Examiner* — Randolph I Chu
(74) *Attorney, Agent, or Firm* — Canon U.S.A., Inc. IP Division (57) ABSTRACT The present disclosure discloses an apparatus and a method for detecting a facial pose, an image processing system, and a storage medium. The apparatus comprises: an obtaining unit to obtain at least three keypoints of at least one face from an input image based on a pre-generated neural network, wherein coordinates of the keypoints obtained via a layer in the neural network for obtaining coordinates are three-dimensional coordinates; and a determining unit to determine, for the at least one face, a pose of the face based on the obtained keypoints, wherein the determined facial pose includes at least an angle. According to the present disclosure, the accuracy of the three-dimensional coordinates of the facial keypoints can be improved, thus the detection precision of a facial pose can be improved.

15 Claims, 9 Drawing Sheets (51) Int. Cl.
*G06V 10/77* (2022.01)
*G06V 10/82* (2022.01)

(52) U.S. Cl.
CPC ............ *G06V 10/82* (2022.01); *G06V 40/164* (2022.01); *G06V 40/165* (2022.01); *G06V 40/169* (2022.01); *G06V 2201/07* (2022.01)

(56) References Cited

U.S. PATENT DOCUMENTS

| | | | |
|---|---|---|---|
| 2018/0097972 A1* | 4/2018 | Bourret | H04N 5/265 |
| 2019/0019014 A1* | 1/2019 | Ye | G06T 7/75 |
| 2019/0279393 A1* | 9/2019 | Ciuc | G06T 13/40 |
| 2020/0265604 A1* | 8/2020 | Lin | G06T 7/73 |
| 2021/0004619 A1* | 1/2021 | Qin | G06V 10/454 |
| 2021/0056291 A1* | 2/2021 | Doublet | G06V 40/18 |
| 2021/0248358 A1* | 8/2021 | Lee | G06V 40/28 |
| 2021/0397859 A1* | 12/2021 | Arora | G06V 40/19 |
| 2022/0005266 A1* | 1/2022 | Glazistov | G06T 17/00 |
| 2022/0027602 A1* | 1/2022 | Zhou | H04N 13/246 |
| 2022/0076000 A1* | 3/2022 | Yang | G06N 3/045 |
| 2022/0138454 A1* | 5/2022 | Zhao | G06V 40/16 382/156 |
| 2022/0180627 A1* | 6/2022 | Zhao | G06F 18/2148 |
| 2022/0270398 A1* | 8/2022 | Takahashi | G06V 40/18 |
| 2022/0318597 A1* | 10/2022 | Yu | G06V 40/172 |
| 2023/0166157 A1* | 6/2023 | Kim | H04N 5/77 348/77 |
| 2023/0206488 A1* | 6/2023 | Puri | G06V 10/764 382/100 |

OTHER PUBLICATIONS

Adrian Bulat, et al., How far are we from solving the 2D & 3D Face Alignment problem? (and a dataset of 230,000 3D facial landmarks), 2017 IEEE International Conference on Computer Vision (ICCV), https://arxiv.org/pdf/1703.07332v3.pdf.

* cited by examiner

APPARATUS AND METHOD FOR DETECTING FACIAL POSE, IMAGE PROCESSING SYSTEM, AND STORAGE MEDIUM

TECHNICAL FIELD

The present disclosure relates to an image processing, and in particular to an apparatus and a method for detecting a facial pose, an image processing system, and a storage medium.

BACKGROUND

Currently a facial pose detection is widely used in various applications such as assisted driving, etc. With a development of deep learning (such as a neural network, etc.) is increasingly used for the facial pose detection. A common practice is, for example, to detect facial keypoints from an input image by utilizing a neural network, and then, estimate an angle of a facial pose in each dimension based on the detected facial keypoints by utilizing a pose estimating method corresponding to each dimension.

Here, regarding the issue of how to detect three-dimensional coordinates of facial keypoints from an input image, a non-patent literature "How far are we from solving the 2D & 3D Face Alignment problem?" (Adrian Bulat, Georgios Tzimiropoulos; ICCV2017) proposes an exemplary method. This non-patent literature discloses an exemplary method for generating three-dimensional coordinates based on two-dimensional coordinates, which mainly comprises: detecting all face regions from an input image; for each face region, obtaining two-dimensional coordinates of facial keypoints from the face region by utilizing a first neural network, respectively; and for each face region, obtaining three-dimensional coordinates of the facial keypoints from the face region by utilizing a second neural network and based on the obtained two-dimensional coordinates of the keypoints.

As described above, it can be learned that, in the above exemplary method, the three-dimensional coordinates of the facial keypoints are obtained through three stages, i.e., firstly obtaining the face regions, then obtaining the two-dimensional coordinates, and then obtaining the three-dimensional coordinates, thus, in a case where errors occur in an operation in any one of the stages, these errors will affect the accuracy of the finally obtained three-dimensional coordinates of the facial keypoints, thus ultimately affecting the detection precision of a facial pose. In addition, when an error occurs, since it is impossible to directly determine in which stage the operation has an error, thus also resulting in an increase in a debugging cost when generating a neural network.

SUMMARY

In view of the recitations in the above Background, the present disclosure is intended to solve at least one of the above problems.

According to one aspect of the present disclosure, an apparatus for detecting a facial pose is provided, and the apparatus comprises: an obtaining unit configured to obtain at least three keypoints of at least one face from an input image based on a neural network, wherein coordinates of the keypoints obtained via a layer in the neural network for obtaining coordinates are all three-dimensional coordinates; and a determining unit configured to determine, for the at least one face, a pose of the face based on the obtained keypoints, wherein the determined facial pose includes at least an angle in one dimension. Wherein in a case where the input image includes faces of different scales, the obtaining unit obtains at least three keypoints of each face simultaneously based on the neural network.

According to another aspect of the present disclosure, a method for detecting a facial pose is provided, and the method comprises: obtaining at least three keypoints of at least one face from an input image based on a neural network; wherein coordinates of the keypoints obtained via a layer in the neural network for obtaining coordinates are all three-dimensional coordinates; and determining, for the at least one face, a pose of the face based on the obtained keypoints, wherein the determined facial pose includes at least an angle in one dimension. Wherein in a case where the input image includes faces of different scales, in the obtaining step, at least three keypoints of each face are obtained simultaneously based on the neural network.

According to a further aspect of the present disclosure, an image processing system is provided, and the system comprises: an image acquisition apparatus for acquiring an image including at least one face; an apparatus for detecting a facial pose; and a post-processing apparatus to perform a corresponding post-processing based on a determined facial pose. Wherein the apparatus for detecting a facial pose comprises: an obtaining unit configured to obtain at least three keypoints of at least one face from the acquired image based on a neural network, wherein coordinates of the keypoints obtained via a layer in the neural network for obtaining coordinates are all three-dimensional coordinates; and a determining unit configured to determine, for the at least one face, a pose of the face based on the obtained keypoints, wherein the determined facial pose includes at least an angle in one dimension. Wherein the image acquisition apparatus and the post-processing apparatus are connected to the apparatus for detecting a facial pose via a network.

According to yet another aspect of the present disclosure, a non-transitory computer-readable storage medium is provided for storing instructions which, when executed by a processor, can cause a facial pose detection to be performed, the instructions comprise: obtaining at least three keypoints of at least one face from an input image based on a pre-generated neural network, wherein coordinates of the keypoints obtained via a layer in the neural network for obtaining coordinates are all three-dimensional coordinates; and determining, for the at least one face, a pose of the face based on the obtained keypoints, wherein the determined facial pose includes at least an angle in one dimension.

As described above, since the coordinates of the facial keypoints obtained via the layer in the pre-generated neural network for obtaining coordinates are all three-dimensional coordinates, thus it can be learned that, in the present disclosure, the three-dimensional coordinates of the facial keypoints are obtained through an operation method in one stage and by utilizing the same feature, therefore the accuracy of the three-dimensional coordinates of the facial keypoints can be improved, and thus the detection precision of a facial pose can be improved. Further, in a case where the input image includes faces of different scales, in the present disclosure, the keypoints of each face can be obtained simultaneously (that is, at one time) via the pre-generated neural network, therefore the detection efficiency of the facial keypoints can be improved, and thus the detection efficiency of facial poses can be improved.

Other features and advantages of the present disclosure will become apparent from the following illustration of typical embodiments with reference to the accompanying drawings.

BRIEF DESCRIPTION OF THE DRAWINGS

The drawings incorporated in and constituting a part of the specification exemplify embodiments of the present disclosure, and together with the description of the embodiments, serve to explain the principle of the present disclosure.

DETAILED DESCRIPTION

Exemplary embodiments of the present disclosure will be described below in detail with reference to the accompanying drawings. It should be noted that the following description is essentially illustrative and exemplary only, and is not intended to limit the present disclosure, its application or usage in any way. Unless specifically stated otherwise, the relative arrangement of components and steps, the numerical expressions and the numerical values that are set forth in the embodiments do not limit the scope of the present disclosure. In addition, the technologies, methods, and devices known to those skilled in the art may not be discussed in detail, but they should be a part of this specification in an appropriate situation.

Note that similar reference numerals and letters refer to similar items in the drawings, and thus once an item is defined in a drawing, it does not have to be discussed in the subsequent drawings. The present disclosure will be described in detail below with reference to the accompanying drawings.

(Hardware Configuration)

Firstly, a hardware configuration that can implement the technology described below will be described with reference to FIG. 1.

The hardware configuration 100 includes, for example, a central processing unit (CPU) 110, a random access memory (RAM) 120, a read only memory (ROM) 130, a hard disk 140, an input device 150, an output device 160, a network interface 170, and a system bus 180. In one implementation, the hardware configuration 100 may be implemented by a computer, such as a tablet, a laptop, a desktop PC, or other suitable electronic devices. In another implementation, the hardware configuration 100 may be implemented by an embedded device, such as a digital camera, a video camera, a web camera, or other suitable electronic devices.

In one implementation, the apparatus for detecting a facial pose according to the present disclosure is configured by hardware or firmware and used as a module or a component of the hardware configuration 100. For example, the apparatus 200 for detecting a facial pose, which will be described in detail below with reference to FIG. 2, or the apparatus 700 for detecting a facial pose, which will be described in detail below with reference to FIG. 7, can be used as a module or a component of the hardware configuration 100. In another implementation, the method for detecting a facial pose according to the present disclosure is configured by software stored in the ROM 130 or the hard disk 140 and executed by the CPU 110. For example, the process 300, which will be described in detail below with reference to FIG. 3, or the process 800, which will be described in detail below with reference to FIG. 8, can be used as a program stored in the ROM 130 or the hard disk 140.

The CPU 110 is any suitable programmable control device (such as a processor), and can perform various functions to be described below by executing various application programs stored in the ROM 130 or the hard disk 140 (such as a memory). The RAM 120 is used to temporarily store programs or data loaded from the ROM 130 or the hard disk 140, and is also used as a space in which the CPU 110 performs various processes (such as, carries out the technology which will be described in detail below with reference to FIGS. 3 to 6C, and FIGS. 8 to 11) and other available functions. The hard disk 140 stores various information such as an operating system (OS), various applications, control programs, images, pre-generated neural networks, and pre-defined data (for example, thresholds (THs)), etc.

In one implementation, the input device 150 is used to allow a user to interact with the hardware configuration 100. In one instance, a user may input images/data through the input device 150. In another instance, a user can trigger a corresponding processing in the present disclosure through the input device 150. In addition, the input device 150 may take various forms, such as a button, a keyboard, or a touch screen. In another implementation, the input device 150 is used to receive images/data output from a dedicated electronic device such as a digital camera, a video camera, and/or a web camera, etc.

In one implementation, the output device 160 is used to display a detection result (such as, a facial pose) to the user. Also, the output device 160 may take various forms, such as a cathode ray tube (CRT) or a liquid crystal display. In another implementation, the output device 160 is used to output the detection result to a subsequent processing such as an assisted driving, etc.

The network interface 170 provides an interface for connecting the hardware configuration 100 to a network. For example, the hardware configuration 100 may perform, via the network interface 170, data communication with other electronic devices connected via a network. Optionally, a wireless interface may be provided for the hardware configuration 100 for performing wireless data communication. The system bus 180 may provide a data transmission path for mutual data transmission among the CPU 110, the RAM 120, the ROM 130, the hard disk 140, the input device 150, the output device 160, the network interface 170, and the like. Although referred to as a bus, the system bus 180 is not limited to any specific data transmission technology.

The above hardware configuration 100 is illustrative only, and is not intended to limit the present disclosure, its application or usage in any way. Moreover, for simplicity, only one hardware configuration is shown in FIG. 1. However, multiple hardware configurations can be used as needed.

(Detection for Facial Pose)

Next, the detection for a facial pose according to the present disclosure will be described with reference to FIGS. 2 to 8.

Figure 2:
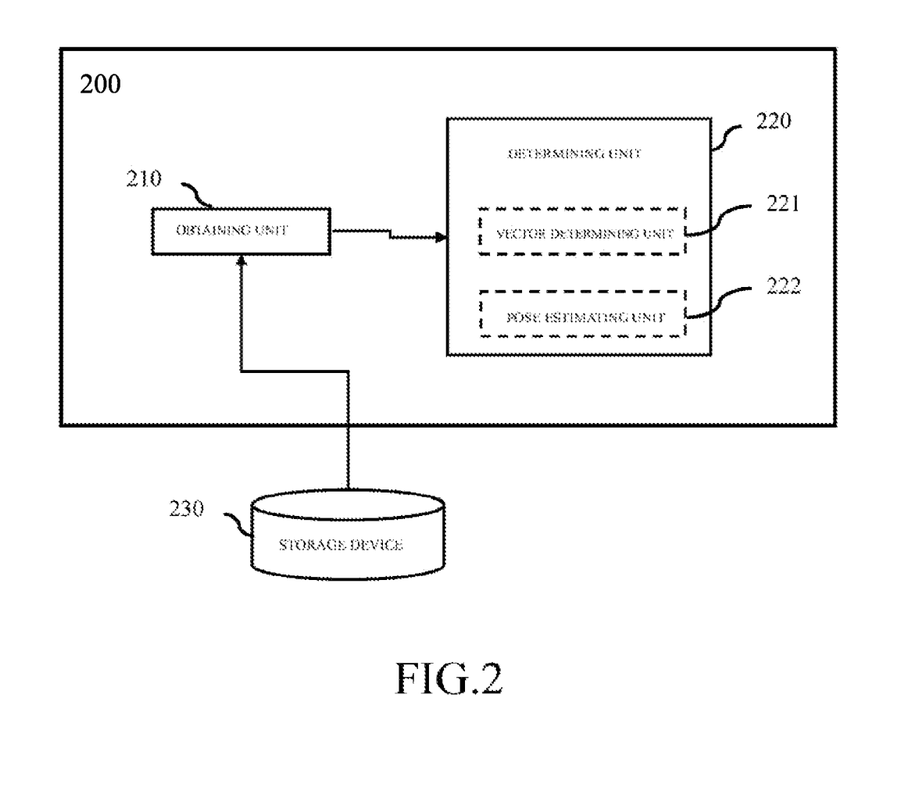
FIG. 2 is a block diagram schematically showing a configuration of an apparatus for detecting a facial pose according to one or more aspects of the present disclosure.

FIG. 2 is a block diagram illustrating a configuration of an apparatus 200 for detecting a facial pose according to a first embodiment of the present disclosure. Here, some or all of the modules shown in FIG. 2 can be implemented by dedicated hardware. As shown in FIG. 2, the apparatus 200 for detecting a facial pose includes an obtaining unit 210 and a determining unit 220.

In addition, the storage device 230 shown in FIG. 2 stores a pre-generated neural network. In one implementation, the storage device 230 is the ROM 130 or the hard disk 140 shown in FIG. 1. In another implementation, the storage device 230 is a server or an external storage device connected to the apparatus 200 for detecting a facial pose via a network (not shown). In addition, optionally, the pre-generated neural network may also be stored in a different storage device.

Figure 1:
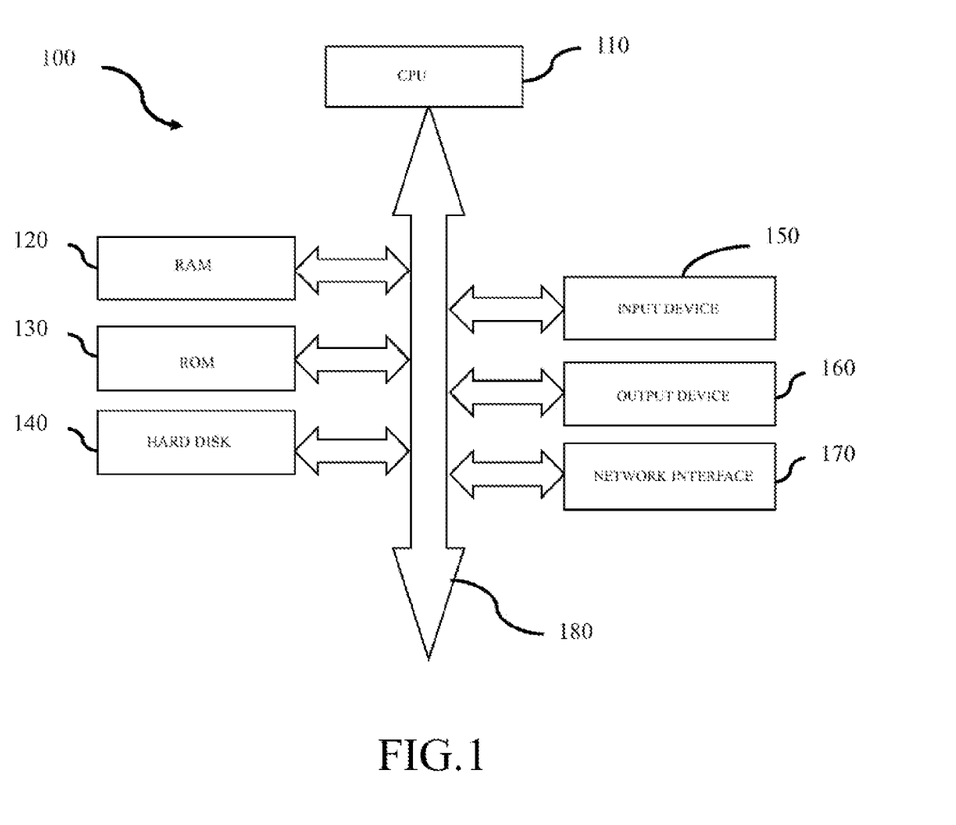
FIG. 1 is a block diagram schematically showing a hardware configuration that can implement the technology according to one or more aspects of the present disclosure.

Firstly, the input device 150 shown in FIG. 1 receives an image output from a dedicated electronic device (for example, a video camera, etc.) or input by a user. Then, the input device 150 transmits the received image to the apparatus 200 for detecting a facial pose via the system bus 180. In the present disclosure, the received image includes at least one face (for example, a human face).

Then, as shown in FIG. 2, the apparatus 200 for detecting a facial pose acquires the pre-generated neural network (hereinafter regarded as for example "first neural network") from the storage device 230. The obtaining unit 210 obtains at least three keypoints of the at least one face from the received image (that is, the input image) based on the first neural network. Here, coordinates of the keypoints obtained via a layer in the first neural network for obtaining coordinates are all three-dimensional coordinates. Here, in a case where the input image includes faces of different scales, the obtaining unit 210 will obtain at least three keypoints of each face simultaneously based on the first neural network. Regarding the first neural network used in the present disclosure, it will be described in detail below with reference to a specific embodiment (for example, with reference to FIG. 9).

The determining unit 220 determines, for the at least one face, a pose of the face based on the obtained keypoints.

Here, for a face, the determined facial pose includes at least an angle in one dimension, for example, the Yaw angle, Pitch angle and/or Roll angle of the face. For a face, in order to enable the estimation of the angle in each dimension of the facial pose to be based on a same reference, and thus the estimation of the angle in each dimension of the facial pose to be consistent so as to improve the detection precision of the facial pose, in one implementation, the determining unit 220 includes a vector determining unit 221 and a pose estimating unit 222. Here, the vector determining unit 221 determines a normal vector of the face based on the obtained keypoints, and the pose estimating unit 222 estimates a pose of the face based on the normal vector of the face.

Finally, the determining unit 220 transmits the detection result (for example, the facial pose) to the output device 160 via the system bus 180 shown in FIG. 1 for displaying the detection result to a user or outputting the detection result to a subsequent processing such as assisted driving, etc.

Figure 3:
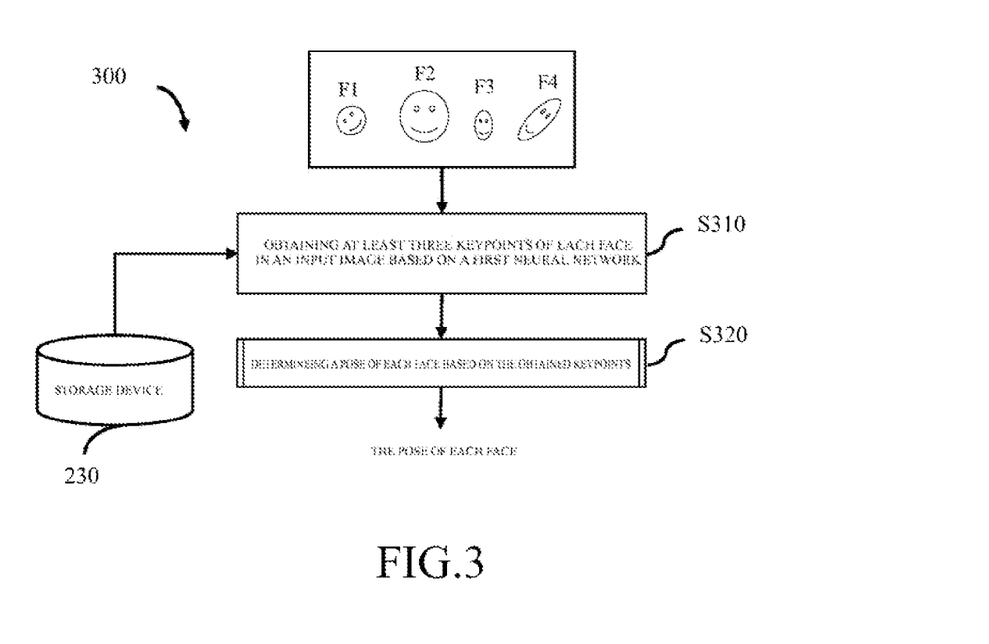
FIG. 3 is a flowchart schematically showing a method for detecting a facial pose according to one or more aspects of the present disclosure.

The method flowchart 300 shown in FIG. 3 is a corresponding process for the apparatus 200 for detecting a facial pose shown in FIG. 2. In the following, an input image, which includes four human faces (F1, F2, F3 and F4) with different scales, will be used as an example for illustration. However, it is apparent that it is not necessarily limited to this. For example, the input image may include one human face, may include multiple human faces with a same scale, or may include multiple human faces with different scales, and so on.

As shown in FIG. 3, the apparatus 200 for detecting a facial pose acquires the pre-generated neural network (that is, the first neural network) from the storage device 230. In the obtaining step S310, the obtaining unit 210 obtains at least three keypoints of four human faces from the input image simultaneously based on the first neural network. Here, coordinates of the keypoints obtained via a layer in the first neural network for obtaining coordinates are all three-dimensional coordinates. Specifically, for example, the obtaining unit 210 inputs the input image into the first neural network, and after a feature extraction by the first neural network, three-dimensional coordinates of four sets of human face keypoints are finally obtained, wherein each set of human face keypoints corresponds to a human face. For example, the obtained keypoints of the human face F1 is $[X_1^1Y_1^1Z_1^1, \ldots, X_k^1Y_k^1Z_k^1]$, the obtained keypoints of the human face F2 is $[X_1^2Y_1^2Z_1^2, \ldots, X_k^2Y_k^2Z_k^2]$, the obtained keypoints of the human face F3 is $[X_1^3Y_1^3Z_1^3, \ldots, X_k^3Y_k^3Z_k^3]$, and the obtained keypoints of the human face F4 are $[X_1^4Y_1^4Z_1^4, \ldots, X_k^4Y_k^4Z_k^4]$, wherein k represents the number of keypoints, and wherein k is greater than or equal to 3. Here, in a case where k=3, the obtained three keypoints are capable of representing an orientation of the human face; here, the three keypoints can be, for example, the center point of the left eye, the center point of the right eye, and the center point of the mouth, or can be the center point of the left eyelid, the center point of the right eyelid, and the center point of the mouth. However, it is apparent that it is not necessarily limited to this.

In the determining step S320, the determining unit 220 determines the pose of each human face based on the obtained keypoints. As described above, in order to improve the detection precision of a facial pose, in one implementation, for a human face (for example, the human face F2), the determining unit 220 performs a corresponding determining operation with reference to FIG. 4.

Figure 4:
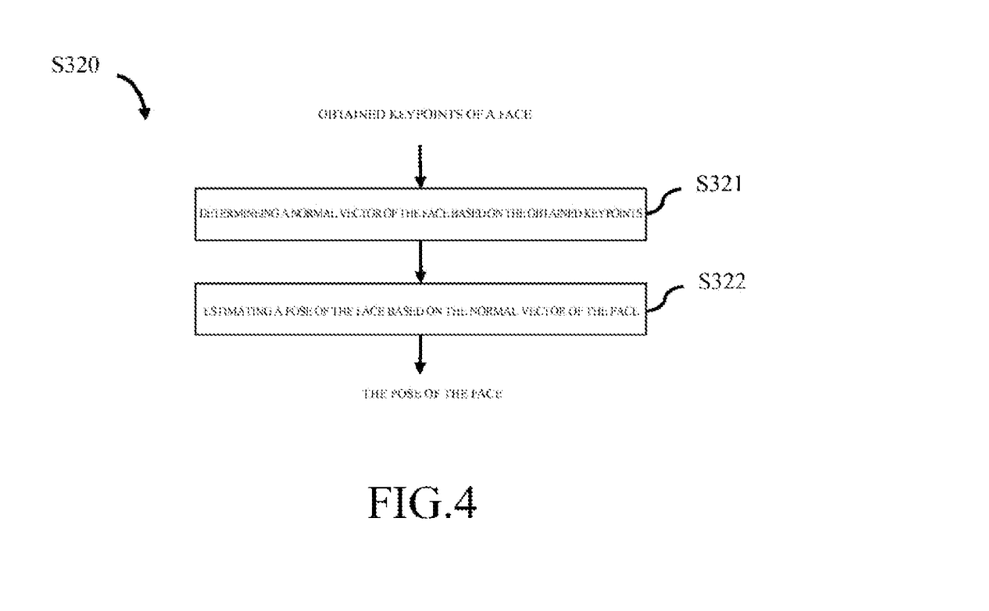
FIG. 4 is a flowchart schematically showing a determining step S320 as shown in FIG. 3 according to one or more aspects of the present disclosure.
Figure 5A:
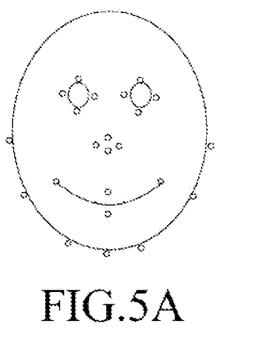
FIGS. 5A to 5C schematically show examples of selecting keypoints capable of representing an orientation of a human face according to one or more aspects of the present disclosure.
Figure 5B:
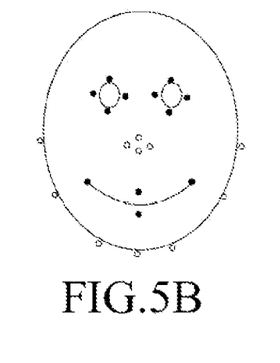
Figure 5C:
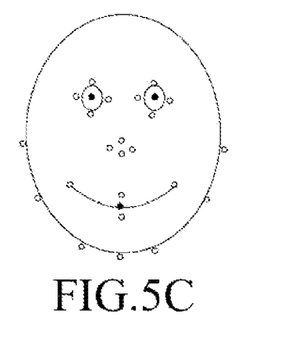

As shown in FIG. 4, in the vector determining step S321, the vector determining unit 221 determines a normal vector of the human face F2 based on the obtained keypoints. Here, in a case where the number of the obtained keypoints is three, as described above, since the obtained three keypoints are capable of representing the orientation of the human face, the vector determining unit 221 determines the normal vector of the human face F2 based on these three keypoints directly. Here, in a case where the number of the obtained keypoints is more than three, the vector determining unit 221 firstly selects keypoints that are capable of representing the orientation of the human face F2 from the obtained keypoints, and then determines the normal vector of the human face F2 based on the selected keypoints. In general, the obtained keypoints of a human face may include, for example, face contour keypoints, keypoints around the eyes, keypoints around the nose, and keypoints around the mouth, etc. (as shown by hollow circles in FIG. 5A), thus according to the distribution of keypoints of a human face and the meaning each keypoint represents, in one implementation, for example, firstly periocular keypoints of the left eye, periocular keypoints of the right eye and keypoints around the mouth (as shown by black dots in FIG. 5B) can be selected from the obtained keypoints of the human face, and then an average keypoint of the left eye is calculated based on the periocular keypoints of the left eye, an average keypoint of the right eye is calculated based on the periocular keypoints of the right eye, and an average keypoint of the mouth is calculated based on the keypoints around the mouth (as shown by black dots in FIG. 5C), and then the normal vector of the human face F2 is determined based on these calculated average keypoints. However, it is apparent that it is not necessarily limited to this, keypoints can be selected for determining the normal vector of the human face F2 as long as they are capable of representing the orientation of the human face F2.

After selecting the keypoints that are capable of representing the orientation of the human face F2, for example, taking the center point of the left eye, the center point of the right eye, and the center point of the mouth as examples, the vector determining unit 221 may firstly construct a vector based on the center point of the left eye and the center point of the mouth and another vector based on the center point of the right eye and the center point of the mouth, and then calculate an outer product of these two vectors as the normal vector of the human face F2. However, it is apparent that it is not necessarily limited to this, for example, the vector between the center point of the left eye and the center point of the mouth and the vector between the center point of the right eye and the center point of the left eye can also be utilized to calculate an outer product as the normal vector of the human face F2, or the vector between the center point of the right eye and the center point of the mouth and the vector between the center point of the left eye and the center point of the right eye can be utilized to calculate an outer product as the normal vector of the human face F2.

Returning back to FIG. 4, in the pose estimating step S322, the pose estimating unit 222 estimates the pose of the human face F2 based on the normal vector of the human face F2. In one implementation, in order to improve the detection precision of a facial pose, the pose estimating unit 222 may firstly estimate the Yaw angle and Pitch angle of the human face F2 based on the normal vector of the human face F2, and then estimate the Roll angle of the human face F2 based on the normal vector of the human face F2 and the estimated Yaw angle and Pitch angle. For example, firstly, as shown in FIG. 6A, the pose estimating unit 222 projects the normal vector ($v_n$) of the human face F2 to the x-z plane, and calculates the angle between the projection vector ($v_{xz}$) and the z-axis unit vector as the Yaw angle of the human face F2.

Figures 6A, 6B:
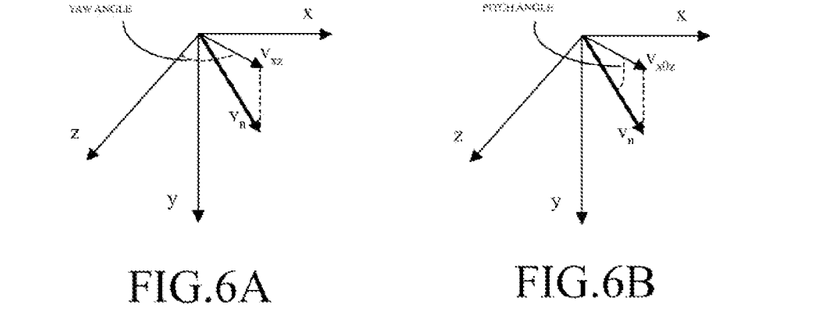
FIGS. 6A to 6C schematically show examples of estimating a pose of a human face based on a normal vector of the human face according to one or more aspects of the present disclosure.

Here, the coordinate system shown in FIG. 6A is the original coordinate system. Here, for example, the Yaw angle is calculated based on the following formulas (1) and (2):

$$\theta_{yaw} = \arccos \frac{Vxz \cdot Z01}{|Vxz||Z01|} \quad (1)$$

$$\theta_{yaw} = \begin{cases} \theta_{yaw}, & \text{if } v_{n-x} > 0 \\ -\theta_{yaw}, & \text{otherwise} \end{cases} \quad (2)$$

Here, $\theta_{yaw}$ represents the Yaw angle, $z_{01}$ represents the z-axis unit vector, and $v_{n-x}$ represents the value on the x-axis corresponding to the normal vector ($v_n$).

Next, as shown in FIG. 6B, the pose estimating unit 222 projects the normal vector ($v_n$) of the human face F2 to the x-z plane, and calculates the angle between the normal vector and the projection vector ($v_{x0z}$) as the Pitch angle of the human face F2. Here, the coordinate system shown in FIG. 6B is the original coordinate system. Here, for example, the Pitch angle is calculated based on the following formulas (3) and (4):

$$\theta_{pitch} = \arccos \frac{Vn \cdot Vx0z}{|Vn||Vx0z|} \quad (3)$$

$$\theta_{pitch} = \begin{cases} \theta_{pitch}, & \text{if } v_{n-y} < 0 \\ -\theta_{pitch}, & \text{otherwise} \end{cases} \quad (4)$$

Here, $\theta_{pitch}$ represents the Pitch angle, and $v_{n-y}$ represents the value on the y-axis corresponding to the normal vector ($v_n$).

Figure 6C:
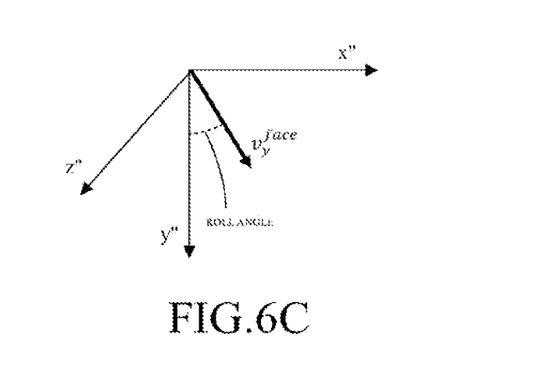

Then, as shown in FIG. 6C, the pose estimating unit 222 generates a rotation matrix $R_y$ based on the Yaw angle, and rotates the y-axis basis vector $v_y$ by an angle of the Yaw angle to obtain the y-axis basis vector $v'_y$ after yaw, wherein $v'_y = R_y * v_y$, wherein, for example, $R_y$ is calculated based on the following formula (5). The pose estimating unit 222 generates a rotation matrix $R_x$ based on the Pitch angle, and rotates the vector $v'_y$ by an angle of the Pitch angle to obtain the y-axis basis vector $v''_y$ after yaw and pitch, wherein $v''_y = R_x * v'_y$, wherein, for example, $R_x$ is calculated based on the following formula (6). The pose estimating unit 222 uses a vector obtained by connecting the center point between the center point of the left eye and the center point of the right eye with the center point of the mouth as the vector ($v_y^{face}$) of the human face F2 in the y-axis direction. The pose estimating unit 222 calculates the angle between the vector ($v_y^{face}$) and the y-axis (y") after the original coordinate system is rotated twice as above as the Roll angle of the human face F2. Here, the coordinate system shown in FIG. 6C is the coordinate system obtained after the original coordinate system is rotated twice as above. Here, for example, the Roll angle is calculated based on the following formulas (7) to (9):

$$R_y = \begin{bmatrix} \cos(yaw) & 0 & \sin(yaw) \\ 0 & 1 & 0 \\ -\sin(yaw) & 0 & \cos(yaw) \end{bmatrix} \quad (5)$$

$$R_x = \begin{bmatrix} 1 & 0 & 0 \\ 0 & \cos(pitch) & \sin(pitch) \\ 0 & \sin(pitch) & \cos(pitch) \end{bmatrix} \quad (6)$$

$$\theta_{roll} = \arccos \frac{v_y^{face} \cdot v''_y}{|v_y^{face}||v''_y|} \quad (7)$$

-continued $$\theta_{roll} = \begin{cases} \theta_{roll}, & \text{if } v_{cross-z} > 0 \\ -\theta_{roll}, & \text{otherwise} \end{cases} \quad (8)$$

$$v_{cross} = v_y^{face} \times v_y'' \quad (9)$$

Here, $\theta_{roll}$ represents the Roll angle, V cross represents the outer product vector of the vector of the human face F2 in the y-axis direction and the y-axis unit vector, and $V_{cross-z}$ represents the value on the z-axis corresponding to the outer product vector $V_{cross}$.

Returning back to FIG. 3, after the determining unit 220 determines the pose of each human face (F1, F2, F3 and F4), the detection results (for example, the facial poses) are transmitted to the output device 160 via the system bus 180 shown in FIG. 1 for displaying the detection result to a user or outputting the detection result to a subsequent processing such as assisted driving, etc.

According to the first embodiment of the present disclosure, since the coordinates of the facial keypoints obtained via the layer in the first neural network for obtaining coordinates are all three-dimensional coordinates, thus in the present disclosure, the three-dimensional coordinates of the facial keypoints are obtained through an operation method in one stage and by utilizing the same feature, therefore the accuracy of the three-dimensional coordinates of the facial keypoints can be improved, and thus the detection precision of a facial pose can be improved. Further, in a case where the input image includes faces of different scales, in the present disclosure, the keypoints of each face can be obtained simultaneously (that is, at one time) via the first neural network, therefore the detection efficiency of the facial keypoints can be improved, and thus the detection efficiency of facial poses can be improved.

Figure 7:
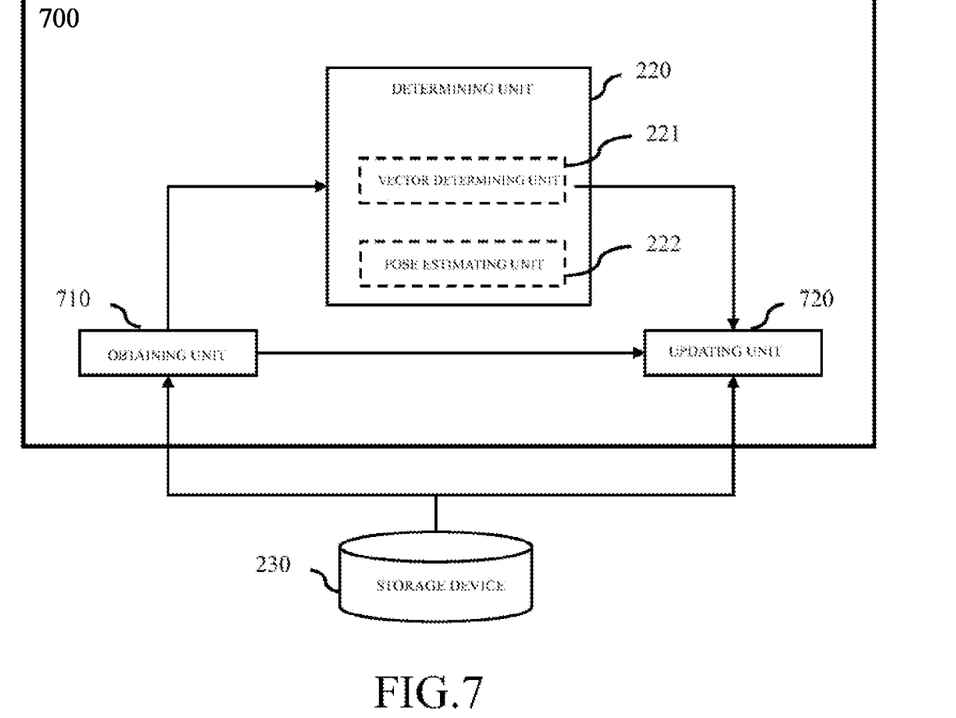
FIG. 7 is a block diagram schematically showing a configuration of an apparatus for detecting a facial pose according to one or more aspects of the present disclosure.

In the above first embodiment of the present disclosure, the three-dimensional coordinates of the keypoints of each face in the input image can be obtained simultaneously via the pre-generated neural network. In order to further improve the detection precision of a facial pose, the pose of each face in the input image can also be directly obtained via a pre-generated neural network. FIG. 7 is a block diagram illustrating a configuration of an apparatus 700 for detecting a facial pose according to a second embodiment of the present disclosure. Here, some or all of the modules shown in FIG. 7 can be implemented by dedicated hardware. As shown in FIG. 7, the apparatus 700 for detecting a facial pose includes an obtaining unit 210, a determining unit 220, and an updating unit 710. Here, the determining unit 220 and the storage device 230 shown in FIG. 7 are the same as the units shown in FIG. 2 and will not be repeated here.

As shown in FIG. 7, the apparatus 700 for detecting a facial pose obtains the pre-generated neural network (hereinafter regarded as for example "second neural network") from the storage device 230. The obtaining unit 710 obtains a pose and at least three keypoints of at least one face from the received image (that is, the input image) based on the second neural network. Here, coordinates of the keypoints obtained via a layer in the second neural network for obtaining coordinates are all three-dimensional coordinates. Here, the pose obtained via the second neural network includes at least one angle. Here, in a case where the input image includes faces of different scales, the obtaining unit 710 will obtain at least three keypoints of each face simultaneously based on the second neural network. Regarding the second neural network used in the present disclosure, it will be described in detail below with reference to a specific embodiment (for example, with reference to FIG. 11).

After the determining unit 220 determines, for the at least one face, the pose of the face based on the obtained keypoints, the updating unit 720 updates, for the at least one face, the facial pose determined by the determining unit 220, based on the facial pose obtained by the obtaining unit 710 and weights obtained from the second neural network.

Finally, the updating unit 720 transmits the detection result (for example, the facial pose) to the output device 160 via the system bus 180 shown in FIG. 1 for displaying the detection result to a user or outputting the detection result to a subsequent processing such as assisted driving, etc.

Figure 8:
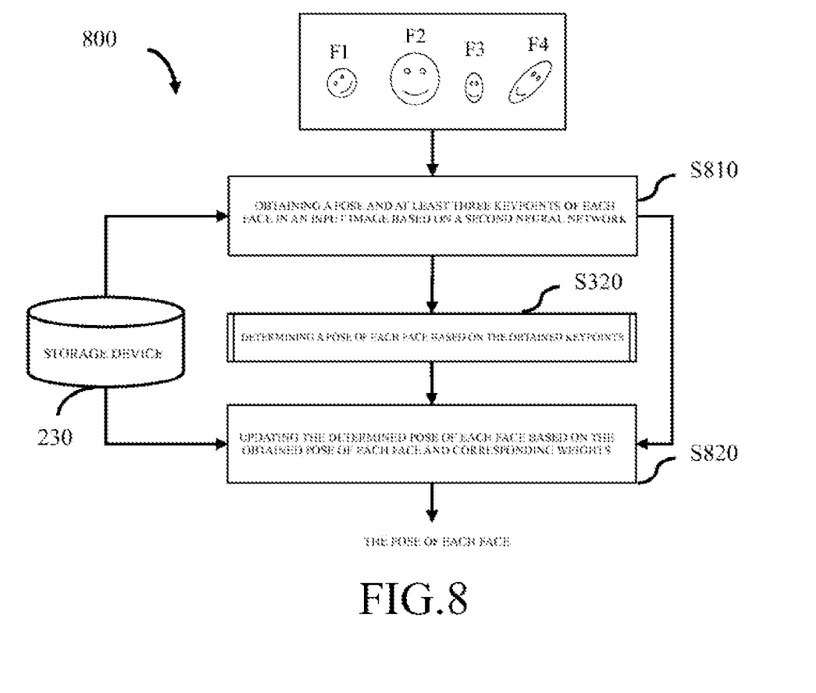
FIG. 8 is a flowchart schematically showing a method for detecting a facial pose according to one or more aspects of the present disclosure.

The method flowchart 800 shown in FIG. 8 is a corresponding process for the apparatus 700 for detecting a facial pose shown in FIG. 7. In the following, still, an input image, which includes four human faces (F1, F2, F3 and F4) of different scales, will be used as an example for illustration. However, it is apparent that it is not necessarily limited to this.

As shown in FIG. 8, the apparatus 700 for detecting a facial pose acquires the pre-generated neural network (that is, the second neural network) from the storage device 230. In the obtaining step S810, the obtaining unit 710 obtains poses and at least three keypoints of four human faces from the input image simultaneously based on the second neural network. Here, coordinates of the keypoints obtained via a layer in the second neural network for obtaining coordinates are all three-dimensional coordinates. Here, the operation for obtaining the three-dimensional coordinates of the keypoints via the second neural network is the same as that in the first embodiment of the present disclosure, and will not be repeated here.

In the determining step S320, the determining unit 220 determines the pose of each human face based on the obtained keypoints. Since the operation performed by the determining unit 220 is the same as that in the first embodiment of the present disclosure, it will not be repeated here.

In the updating step S820, the updating unit 720 obtains pre-generated superposition weights from the second neural network, and updates, for each human face (F1, F2, F3 and F4), the facial pose determined in the determining step S320 based on the facial pose obtained in the obtaining step S810 and the superposition weights. For example, taking the human face F2 as an example, assuming that the angle for the pose obtained in the obtaining step S810 is ang_1, and the angle for the pose determined in the determining step S320 is ang_2, the updating unit 720 can update the pose determined in the determining step S320, for example, based on the following formula (10):

$$\text{ang\_3} = \alpha * \text{ang\_1} + \beta * \text{ang\_2} \quad (10)$$

Here, ang_3 represents the angle of the pose after the updating, and $\alpha$ and $\beta$ represent the superposition weights obtained from the second neural network.

Finally, after the updating unit 720 has updated the pose of each human face (F1, F2, F3 and F4), the detection results (for example, the facial poses) are transmitted to the output device 160 via the system bus 180 shown in FIG. 1 for displaying the detection result to a user or outputting the detection result to a subsequent processing such as assisted driving, etc.

In the second embodiment of the present disclosure, since the facial pose obtained directly via the second neural network is utilized to update the facial pose determined based on the keypoints, according to the second embodiment of the present disclosure, the detection precision of a facial pose can be further improved.

(Generation of Neural Network)

Next, the generation of the neural network used in the present disclosure will be described with reference to FIGS. 9 and 10.

Figure 9:
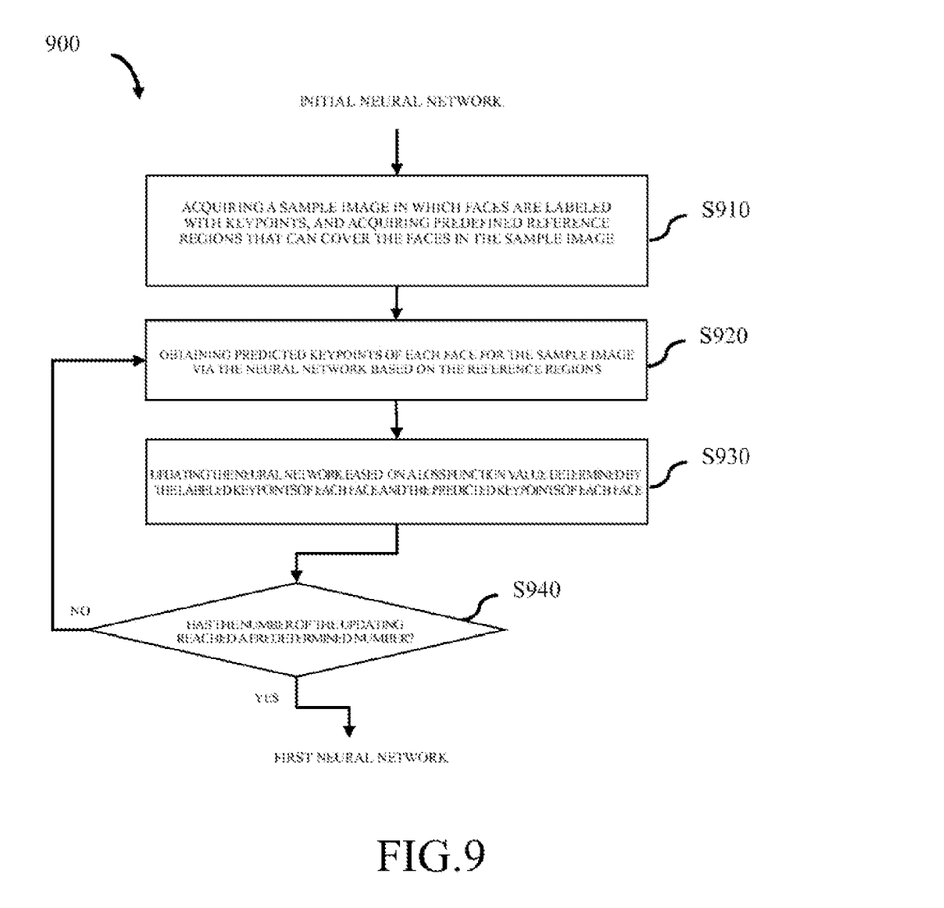
FIG. 9 is a flowchart schematically showing a method for generating a first neural network used in one or more aspects of the present disclosure.
Figure 10A:
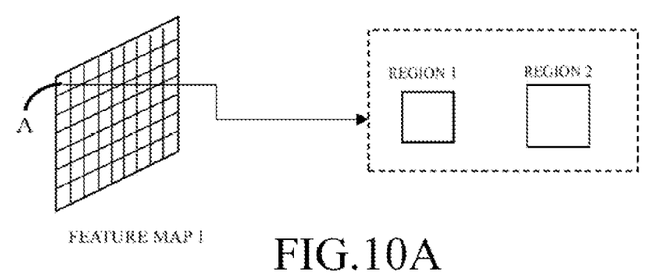
FIGS. 10A to 10C schematically show examples of generating reference regions on a feature map according to one or more aspects of the present disclosure.
Figure 10B:
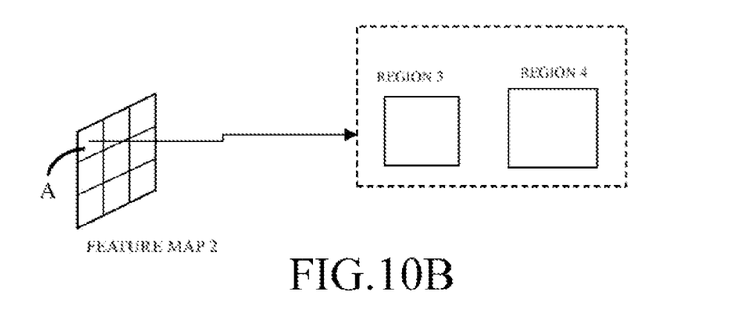
Figure 10C:
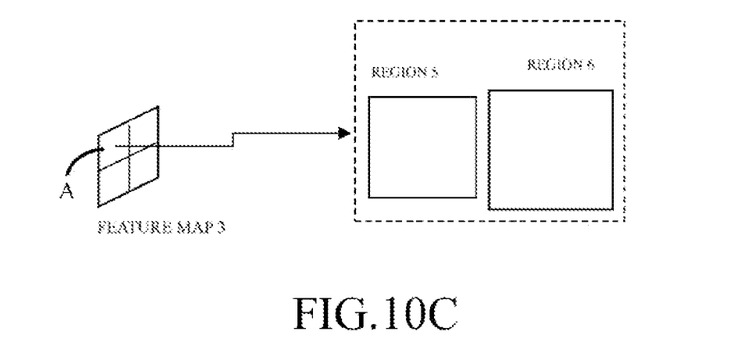

FIG. 9 is a flowchart 900 schematically showing a method for generating the first neural network used in the first embodiment of the present disclosure. In the flowchart 900 shown in FIG. 9, a utilization of a deep learning method to generate a corresponding neural network is taken as an example for illustration; however, it is apparent that it is not necessarily limited to this. Here, the method with reference to FIG. 9 can also be performed by the hardware structure 100 shown in FIG. 1.

As shown in FIG. 9, firstly, the CPU 110 as shown in FIG. 1 acquires a preset initial neural network through the input device 150.

Next, in step S910, the CPU 110 acquires, through the input device 150, a sample image in which faces are labeled with keypoints, and acquires predefined reference regions that can cover the faces in the sample image. Here, the sample image includes at least one face, and for each face, at least three keypoints are labeled. Here, in order to make it possible to obtain keypoints of each face simultaneously (that is, at one time) via the generated neural network in a case where the input image includes faces of different scales, in the present disclosure, reference regions are predefined that can cover the faces in the sample image. Here, in order to make coordinates of the facial keypoints obtained via a layer in the generated neural network for obtaining coordinates be all three-dimensional coordinates, in the present disclosure, coordinates of the keypoints labeled for the faces are three-dimensional coordinates, and coordinates of the center points of the predefined reference regions are also three-dimensional coordinates (wherein the z-axis coordinates of the center points are 0).

In step S920, the CPU 110 obtains predicted keypoints of each face for the sample image via the neural network based on the predefined reference regions. In one implementation, on one hand, different feature maps can be obtained from a feature extraction for the sample image via the neural network. On another hand, for each obtained feature map, based on scales of the predefined reference regions and a size of the feature map, corresponding reference regions are generated at each position of the feature map (for example, at each pixel point), thus all reference regions on the feature map are obtained. For example, as shown in FIG. 10A, for the feature map 1, the corresponding reference regions generated at the position A thereof are, for example, region 1 and region 2. For example, as shown in FIG. 10B, for the feature map 2, the corresponding reference regions generated at the position A thereof are, for example, region 3 and region 4. For example, as shown in FIG. 10C, for the feature map 3, the corresponding reference regions generated at the position A thereof are, for example, region 5 and region 6. Here, for a feature map, a coordinate of a center point of the obtained reference region is (x, y, 0), wherein x and y can be calculated according to the position corresponding to the reference region in the feature map. On yet another hand, based on all the reference regions generated on each feature map, the predicted keypoints of each face can be obtained.

In step S930, the CPU 110 calculates, for each face, a corresponding loss function value based on the labeled keypoints of the face and the predicted keypoints of the face, and then, the CPU 110 updates the neural network based on the loss function value. Here, for a face, for example, the balanced L1 loss function $L1(l_i; 1^*_i)$ can be utilized to calculate the corresponding loss function value, wherein i represents the i-th face in the sample image, $l_i=\{1_{xl}, 1_{yl}, 1_{zl} \ldots L_{xk}, 1_{yk}, 1_{zk}\}_i$ represents the predicted keypoints of the i-th face, $1^*_i=\{1^*_{xl}, 1^*_{yl}, 1^*_{zl} \ldots 1^*_{xk}, 1^*_{yk}, 6^*_{zk}\}_i$ represents the labeled keypoints of the i-th face, and k represents the number of the keypoints (wherein k is greater than or equal to 3).

Then, in step S940, the CPU 110 will further judge whether the updated neural network satisfies a predetermined condition, for example, a total number (for example, T times) of updatings required have been completed or a predetermined performance has been reached (for example, the loss function value tends to be a constant value). If the neural network has not yet met the predetermined condition, the CPU 110 will return to execute step S920 and step S930 again. If the neural network has met the predetermined condition, the CPU 110 stores the generated neural network (that is, the first neural network), for example, into the storage device 230 as shown in FIG. 2.

Figure 11:
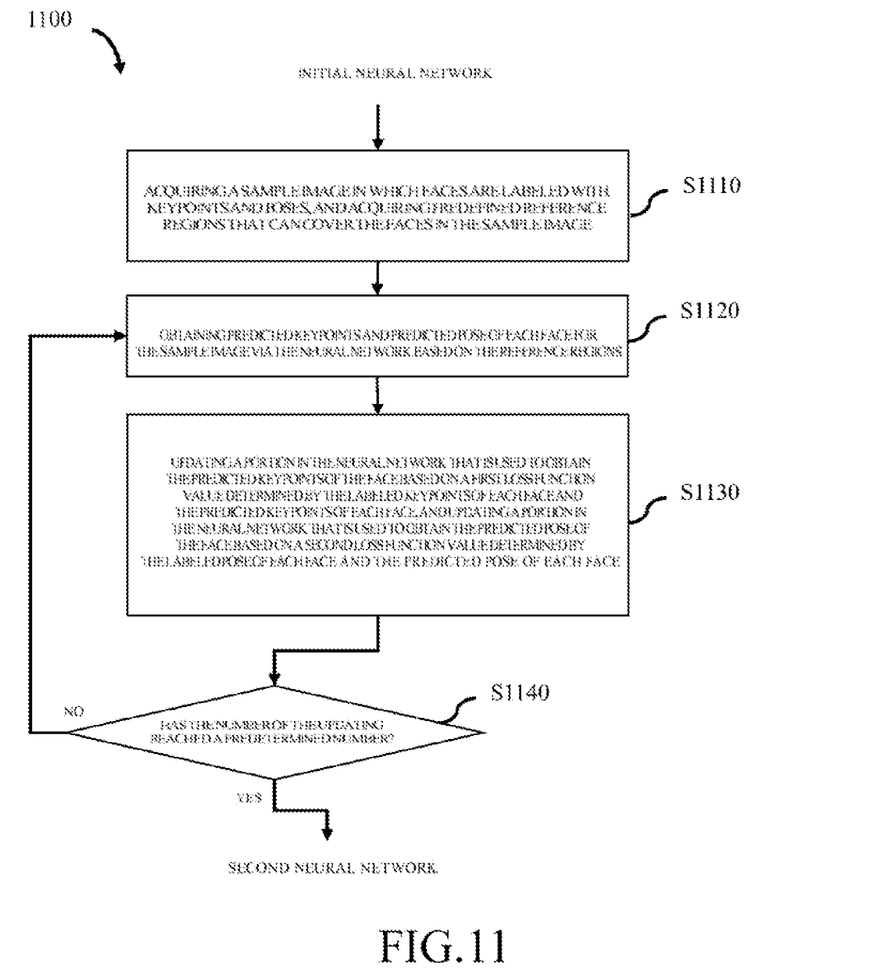
FIG. 11 is a flowchart schematically showing a method for generating a second neural network used in one or more aspects of the present disclosure.

FIG. 11 is a flowchart 1100 schematically showing a method for generating a second neural network used in the second embodiment of the present disclosure. In the flowchart 1100 shown in FIG. 11, a utilization of a deep learning method to generate a corresponding neural network is taken as an example for illustration; however, it is apparent that it is not necessarily limited to this. Here, the method with reference to FIG. 11 can also be performed by the hardware structure 100 shown in FIG. 1.

As shown in FIG. 11, firstly, the CPU 110 as shown in FIG. 1 acquires a preset initial neural network through the input device 150.

Next, in step S1110, the CPU 110 acquires, through the input device 150, a sample image in which faces are labeled with keypoints and poses, and acquires predefined reference regions that can cover the faces in the sample image. Here, the sample image includes at least one face. Here, for each face, at least three keypoints are labeled, and the labeled pose includes at least an angle in one dimension. Here, coordinates of the keypoints labeled for the faces are three-dimensional coordinates, and coordinates of the center points of the predefined reference regions are also three-dimensional coordinates (wherein the z-axis coordinates of the center points are 0).

In step S1120, the CPU 110 obtains predicted keypoints of each face for the sample image via the neural network based on the predefined reference regions. Since the operation of step S1120 is the same as that of step S920 in FIG. 9, it will not be repeated here.

In step S1130, on one hand, the CPU 110 calculates, for each face, a first loss function value based on the labeled keypoints of the face and the predicted keypoints of the face, and updates a portion in the neural network that is used to obtain the predicted keypoints of the face based on the first loss function value. On the other hand, the CPU 110 calculates, for each face, a second loss function value based on the labeled pose of the face and the predicted pose of the face, and updates a portion in the neural network that is used to obtain the predicted pose of the face based on the second loss function value. Here, as described above, for example, the balanced L1 loss function may also be utilized to calculate the first loss function value and the second loss function value.

Then, in step S1140, the CPU 110 will further judge whether the updated neural network satisfies a predetermined condition, for example, a total number (for example, T times) of updatings have been completed or a predetermined performance has been reached (for example, the loss function value tends to be a constant value). If the neural network has not yet met the predetermined condition, the CPU 110 will return to execute step S1120 and step S1130 again. If the neural network has met the predetermined condition, the CPU 110 stores the generated neural network (that is, the second neural network), for example, into the storage device 230 as shown in FIG. 7.

(Application)

Figure 12:
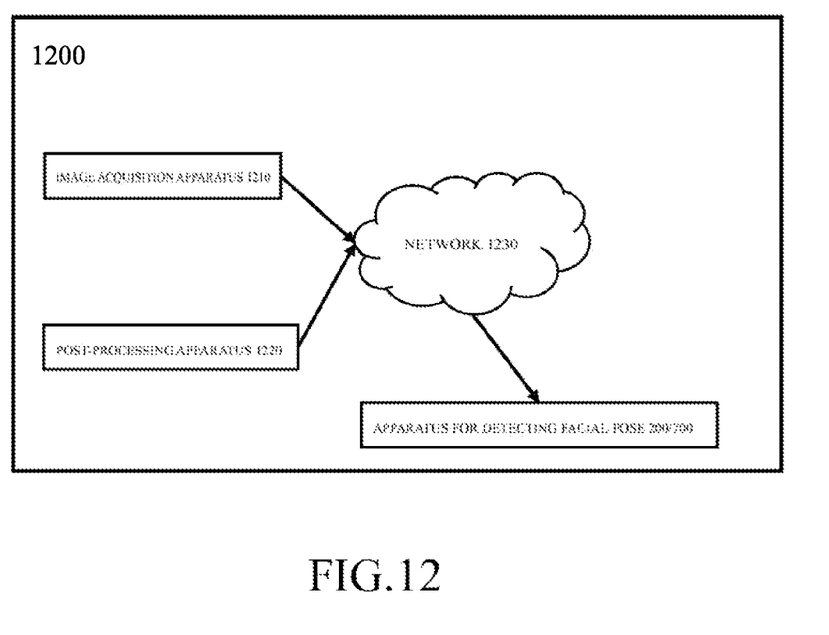
FIG. 12 schematically shows an arrangement of an exemplary application system according to one or more aspects of the present disclosure.

As described above, the detection result (for example, the facial pose) obtained according to the present disclosure can be displayed to the user or used as an input to a subsequent processing such as assisted driving, etc. FIG. 12 schematically shows an arrangement of an exemplary application system according to an embodiment of the present disclosure. As shown in FIG. 12, an image processing system 1200 includes an image acquisition apparatus 1210, a post-processing apparatus 1220, and an apparatus 200/700 for detecting a facial pose as shown in FIG. 2 or FIG. 7. Here, the image acquisition apparatus 1210, the post-processing apparatus 1220, and the apparatus 200/700 for detecting a facial pose are connected to each other via a network 1230, for example.

As shown in FIG. 12, the image acquisition apparatus 1210 may, for example, be a video camera, for acquiring an image including at least one face.

The apparatus 200/700 for detecting a facial pose, as described above, may include: an obtaining unit to obtain at least three keypoints of the at least one face from the acquired image based on a pre-generated neural network; wherein coordinates of the keypoints obtained via a layer in the neural network for obtaining coordinates are all three-dimensional coordinates; and a determining unit to determine, for the at least one face, a pose of the face based on the obtained keypoints; wherein the determined facial pose includes at least an angle in one dimension.

The post-processing apparatus 1220 performs a corresponding post-processing based on the detected facial pose. For example, for assisted driving, the post-processing apparatus 1220 may determine whether a driver has a dangerous driving behavior such as fatigue driving, not looking straight ahead on the road, etc., based on the detected facial pose. In a case where the driver has a dangerous driving behavior, the post-processing apparatus 1220 may, for example, issue warning information to the driver.

All the units described above are exemplary and/or preferred modules for implementing the processing in the disclosure. These units can be hardware units (such as field programmable gate arrays (FPGA), digital signal processors, application specific integrated circuits, etc.) and/or software modules (such as computer readable programs). The units used to implement each step are not described in detail above. However, when there is a step for executing a specific process, there can be a corresponding functional module or unit (implemented by hardware and/or software) for implementing the same process. The technical solutions constituted by all combinations of the described steps and units corresponding to these steps are included in the disclosure of the present application, as long as the technical solutions that they constitute are complete and applicable.

The method and the apparatus in the present invention can be embodied in a variety of ways. For example, the method and the apparatus in the present invention can be embodied by software, hardware, firmware or any combination thereof. Unless specifically stated otherwise, the above order of the steps in the present method is only intended to be illustrative, and the steps of the method in the present invention are not limited to the order specifically described above. In addition, in some embodiments, the present invention may also be embodied as a program recorded in a recording medium, which includes machine-readable instructions for implementing the method according to the present invention. Therefore, the present invention also covers a recording medium storing a program for implementing the method according to the present invention.

Although some specific embodiments of the present invention have been presented by examples in detail, those skilled in the art should understand that the above examples are only intended to be illustrative and do not limit the scope of the present invention. Those skilled in the art should understand that the above embodiments can be modified without departing from the scope and spirit of the present invention. The scope of the present invention is restricted by the appended claims.

This application claims the benefit of Chinese Patent Application No. 202110262393.3, filed Mar. 10, 2021, which is hereby incorporated by reference herein in its entirety.

What is claimed is:

1. An apparatus for detecting a facial pose, comprising:
an obtaining unit configured to obtain at least three keypoints of at least one face from an input image based on a neural network, wherein coordinates of the keypoints obtained via a layer in the neural network for obtaining coordinates are three-dimensional coordinates, wherein for the at least one face, the obtaining unit further obtains a pose of the face based on the neural network;
a determining unit configured to determine, for the at least one face, a pose of the face based on the obtained keypoints, wherein the determined facial pose includes at least an angle in one dimension; and
an updating unit configured to update, for the at least one face, the determined facial pose based on the obtained facial pose and weights obtained from the neural network.

2. The apparatus according to claim 1, wherein in a case where the input image includes faces of different scales, the obtaining unit obtains at least three keypoints of each face simultaneously based on the neural network.

3. The apparatus according to claim 2, wherein the neural network is pre-generated by:
acquiring a sample image in which faces are labeled with keypoints and acquiring predefined reference regions that can cover the faces in the sample image; wherein the sample image includes at least one face, wherein for a face, at least three keypoints are labeled, and coordinates of the labeled keypoints are three-dimensional coordinates; wherein coordinates of center points of the predefined reference regions are three-dimensional coordinates;
obtaining predicted keypoints of each face for the sample image via the neural network based on the predefined reference regions; and
updating the neural network based on a loss function value, wherein the loss function value is determined based on the labeled keypoints of each face and the predicted keypoints of each face.

4. The apparatus according to claim 1, wherein the determining unit comprises:
a vector determining unit configured to determine, for the at least one face, a normal vector of the face based on the obtained keypoints; and a pose estimating unit configured to estimate, for the at least one face, the pose of the face based on the normal vector of the face.

5. The apparatus according to claim 4, wherein for the at least one face, in a case where the obtaining unit obtains three keypoints of the face, the three keypoints are capable of representing an orientation of the face.

6. The apparatus according to claim 4, wherein for the at least one face, in a case where the obtaining unit obtains more than three keypoints of the face, the vector determining unit configured to:
   select keypoints that are capable of representing an orientation of the face from the obtained keypoints; and
   determine the normal vector of the face based on the selected keypoints.

7. The apparatus according to claim 4, wherein the pose estimating unit configured to:
   estimate a yaw angle and a pitch angle of the face respectively based on the normal vector of the face; and
   estimate a roll angle of the face based on the normal vector and the estimated yaw angle and pitch angle of the face.

8. The apparatus according to claim 1, wherein the neural network is pre-generated by:
   acquiring a sample image in which faces are labeled with keypoints and poses and acquiring predefined reference regions that can cover the faces in the sample image; wherein the sample image includes at least one face; wherein for a face, at least three keypoints are labeled, and coordinates of the labeled keypoints are three-dimensional coordinates, and the labeled pose includes at least an angle in one dimension; wherein coordinates of center points of the predefined reference regions are three-dimensional coordinates;
   obtaining predicted keypoints and predicted pose of each face for the sample image via the neural network based on the predefined reference regions;
   updating a portion in the neural network that is used to obtain the predicted keypoints of the face based on a first loss function value and updating a portion in the neural network that is used to obtain the predicted pose of the face based on a second loss function value, wherein the first loss function value is determined based on the labeled keypoints of each face and the predicted keypoints of each face, and the second loss function value is determined based on the labeled pose of each face and the predicted pose of each face.

9. A method for detecting a facial pose comprising:
   obtaining at least three keypoints of at least one face from an input image based on a pre-generated neural network, wherein coordinates of the keypoints obtained via a layer in the neural network for obtaining coordinates are three-dimensional coordinates, wherein for the at least one face, the obtaining unit further obtains a pose of the face based on the neural network;
   determining, for the at least one face, a pose of the face based on the obtained keypoints, wherein the determined facial pose includes at least an angle in one dimension; and
   an updating unit configured to update, for the at least one face, the determined facial pose based on the obtained facial pose and weights obtained from the neural network.

10. The method according to claim 9, wherein in a case where the input image includes faces of different scales, in the obtaining of keypoints, at least three keypoints of each face are obtained simultaneously based on the neural network.

11. The method according to claim 9, wherein the determining of the pose of the face comprises:
    determining, for the at least one face, a normal vector of the face based on the obtained keypoints; and
    estimating, for the at least one face, the pose of the face based on the normal vector of the face.

12. The method according to claim 9, wherein for the at least one face, in the obtaining of the at least three keypoints, a pose of the face is further obtained based on the neural network.

13. The method according to claim 12, the method further comprises:
    updating, for the at least one face, the determined facial pose based on the obtained facial pose and weights obtained from the neural network.

14. An image processing system comprises:
    an image acquisition apparatus for acquiring an image including at least one face;
    an apparatus for detecting a facial pose, comprising:
        an obtaining unit configured to obtain at least three keypoints of at least one face from the acquired image based on a neural network, wherein coordinates of the keypoints obtained via a layer in the neural network for obtaining coordinates are three-dimensional coordinates, wherein for the at least one face, the obtaining unit further obtains a pose of the face based on the neural network;
        a determining unit configured to determine, for the at least one face, a pose of the face based on the obtained keypoints, wherein the determined facial pose includes at least an angle in one dimension;
        an updating unit configured to update, for the at least one face, the determined facial pose based on the obtained facial pose and weights obtained from the neural network; and
    a post-processing apparatus to perform a corresponding post-processing based on the detected facial pose,
    wherein the image acquisition apparatus and the post-processing apparatus are connected to the apparatus for detecting a facial pose via a network.

15. A non-transitory computer-readable storage medium for storing instructions which, when executed by a processor, can cause a facial pose detection to be performed, the instructions comprising:
    obtaining at least three keypoints of at least one face from an input image based on a pre-generated neural network; wherein coordinates of the keypoints obtained via a layer in the neural network for obtaining coordinates are three-dimensional coordinates, wherein for the at least one face, a pose of the face based on the neural network is further obtained;
    determining, for the at least one face, a pose of the face based on the obtained keypoints; wherein the determined facial pose includes at least an angle in one dimension; and
    updating, for the at least one face, the determined facial pose based on the obtained facial pose and weights obtained from the neural network.

* * * * *